United States Patent Office 3,299,503
Patented Jan. 24, 1967

3,299,503
PROCESS FOR THE PRODUCTION OF BONDED METAL STRUCTURES
Donald L. Freyberger and John F. Longenecker, Coatesville, Pa., assignors to Lukens Steel Company, a corporation of Pennsylvania
No Drawing. Filed Aug. 29, 1963, Ser. No. 305,519
14 Claims. (Cl. 29—471.5)

This invention is concerned with spraying of metal layers on ingots or rolled products of a base metal, particularly carbon or low alloy steel, for the purpose of producing a dense and ductile layer bonded to the base by diffusion. Coatings which result from the process of the invention may be utilized as either interlayers in clad metals or as cladding layers. In the former case, the ductile bonded layer on the base material is used to enhance the manufacturing procedure for roll clad or forge clad materials by providing a transition layer at the interface of the components of the clad assembly which serves a useful purpose in the manufacturing procedure—such as regulation of diffusion or surface protection. In the latter case, the coating produced by the method of the invention becomes itself the cladding layer rather than an agent in the bonding of two other metal products.

However, for either use, the method of producing the dense bonded coating from sprayed metal layers on a metal base is essentially the same and comprises the fundamental teaching of this invention.

It has been discovered that the properties of sprayed metal coatings may be substantially improved and made more useful for many purposes by the method of the invention which for applications involving large objects is both simpler and more economical than taught by the prior art.

In this method, a metal sprayed surface is enclosed within an assembly of carbon or low alloy steel which is substantially, although not necessarily completely, sealed from the atmosphere where it is heated to a temperature above 1200° F. and soaked at this temperature for such period of time such as is normal and well known in the art to prepare the metal for hot working operations. As a result of this treatment, the metal sprayed layers, which were porous to a certain degree and contain oxides to a greater or lesser extent and were only mechanically bonded to each other and to the base surface from the spraying operation become consolidated and metallurgically bonded internally and to the base metal by reduction and diffusion which takes place in the assembly. It has been discovered that it is unnecessary to introduce reducing gases or other reducing agents into the assembly in order to eliminate such oxides as may be incorporated in the sprayed layer or are present at the interface of the sprayed metal and the base. Nor is it necessary to use a vacuum or inert atmosphere within the enclosure during heating to permit diffusion.

It is hence our discovery that reduction of oxides and films occurs by agency of carbonaceous gases generated within the enclosure by the reaction of the atmosphere trapped within the enclosure and the normal carbon content of the mild or low alloy steel forming the enclosure. The most important active gas generated within the enclosure is carbon monoxide, though hydrocarbons and hydrogen may be present.

The reactions within the enclosure depend upon a number of factors, such as temperature, period of time at a given temperature, composition of the sprayed layer, composition of the steel, and the ratio of interior surface to volume of the enclosure. However, in practice, the interrelation of these factors does not have to be known. It is necessary only to make an enclosure for the sprayed layer having a relatively small volume-to-surface ratio, and to heat and soak it in accordance with normal schedules for hot working. For lower temperatures, soaking time is increased.

In many cases, it is desirable that the ingot, slab, plate or other steel product coated with sprayed metal itself form part of the enclosure. In any event, it is essential to the method of this invention that at least one major surface, whether or not it is spray coated, be carbon or low alloy steel.

An enclosure of this description bears a close resemblance to the assembly or pack used in the manufacture of clad plate, sheet, or strip by the rolling process. In fact, it is an object of this invention to teach a method by which coatings useful in the roll cladding process may be effectively applied using the clad pack as the enclosure.

It is a further object of this invention that packs or assemblies consisting of at least one carbon or alloy steel casting or wrought member may be used to produce dense, ductile bonded coatings on steel or other metal surfaces, which coatings may then be rolled or used without subsequent working.

As related to the manufacture of roll clad plate, the method of this invention makes it possible to produce one or more primary metal layers or alloy layers between a metal such as stainless steel which is to become the cladding and a metal such as carbon steel which is to become the base, by simply spray coating the base material without the introduction of reducing agents, inert gases or vacuum. The functions of such layers are various. For instance, they may aid in bonding in the case of soft iron or nickel, they may be used to prevent oxidation of the base steel such as chromium-molybdenum steel types, or they may provide a diffusion barrier to prevent carbon migration.

Heretofore, methods for producing such layers involved elaborate and expensive procedures and equipment for injecting reducing gases or heating in a controlled atmosphere furnace or in vacuum. Alternatively, it has been necessary to electroplate the carbon steel or other metal comprising at least one member of the assembly. While this is not difficult or expensive to do for small objects, the instant discovery makes it simple and economical to apply metal layers to large objects. In addition, the capability to produce dense, ductile layers by metal spraying widens the scope of alloys which may be used in the clad art, since many alloys cannot be electroplated or can be plated only at great expense. In contrast, any alloy for which the wire or powder raw material is obtainable can be sprayed, and the sprayed coatings can be applied in layers of two or more primary metals or alloys. For example, a layer of copper and a layer of nickel which alloy during heating provide an intermediate layer which bonds at rolling temperatures and retards carbon migration in the clad product.

As used in manufacture of clad plate, sheet or strip in which the sprayed metal layer becomes the cladding, the method of the invention permits any of several types of assemblies: (1) a pack consisting of ingots or unfinished wrought products sealed and containing a parting material which is heated and rolled; (2) a pack consisting of finished flat rolled products which is sealed, heated, and then opened to give one or more plates, sheets, or strips having a well-consolidated, ductile and bonded coating formed from the sprayed metal, and (3) packs consisting of metals other than steel and refractory alloys or metals, which are spray coated and enclosed in a tight assembly of carbon or low alloy steel which is sealed and heated to enhance the physical and mechanical properties of the coated layer.

For optimum results in the method of this invention it is important that not only the sealed enclosure for the sprayed metal includes at least one major surface of carbon or alloy steel, but also that metals used in the coating and metals to be coated exposed within the pack be non-refractory and of low reactivity under the conditions obtaining in heating within the pack. For example, stainless steel, high chromium nickel base alloys and titanium are unsuitable in the sense that the coating obtained will not be 100% metallurgically bonded thereto in the absence of a pressure step. On the other hand, iron, nickel, copper and various alloys in which these elements are the major constituent are suitable.

The following are examples of the method practiced in accordance with the invention:

EXAMPLE I

A backing plate 10″ by 8″ by 2″ of A.S.T.M. Type A387–D steel was grit blasted on one of its surfaces. This surface was then sprayed with nickel using the plasma-arc spray method under argon gas. A cover plate, also 10″ by 8″ by 2″, of mild steel, A.S.T.M. Type A285–C, was placed over the sprayed metal coating with an intermediate layer of parting compound. The assembly was then welded around the periphery except for a vent hole.

It was heated to 2150° F. and held at this temperature for a period of four hours. It was thereafter allowed to cool in air to room temperature and cut apart.

The nickel had the bright, clear color which is characteristic of pure nickel although it had had previously a dirty grey appearance following its application to the backing steel. The nickel was 100% metallurgically bonded to the backing plate and micro-examination indicated that the sprayed nickel had diffused satisfactorily into the backing steel plate. On bending a section of the nickel coated steel over a ¾″ radius pin, the nickel adhered to the backing plate.

EXAMPLE II

A nickel clad plate of A.S.T.M. Type A387–D steel was prepared by the same process as Example I except that following the heating step, the assembly was reduced to 28% of its original thickness by the application of pressure. The assembly was then allowed to cool in air to room temperature and was cut apart. As with Example I, the nickel had a clear bright color characteristic of pure nickel and micro-examination of a section of the clad plate disclosed an excellent metallurgical bond with uniformly good diffusion into the backing plate.

EXAMPLE III

A plate 6″ by 6″ by 1″ of mild steel, A.S.T.M. Type A285–C, was prepared on one of its sides by grit blasting. Nickel was then sprayed on such prepared surface using the plasma-arc spray method under argon gas. A cover plate of 6″ by 6″ by 1″ of the same type of mild steel, A.S.T.M. Type A285–C, was provided together with an intermediate layer of parting compound to form an assembly wherein the sprayed nickel was sandwiched between the two plates of mild steel. The assembly was then welded around its periphery except for an area employed as a vent hole, and was heated to 2150° F., at which temperature it was held for four hours. It was then allowed to cool in air to room temperature and separated for examination.

As in the previous examples, the nickel was clear with the bright color characteristic of pure nickel. Micro-inspection disclosed a good metallurgical bond to the mild steel backing plate together with satisfactory diffusion.

EXAMPLE IV

A nickel clad mild steel was prepared in accordance with Example III except that following the heating step, the assembly was reduced by pressure means to approximately 31% of its original thickness. The reduced pack was then allowed to cool in air to room temperature and separated for examination.

As with the previous examples, the nickel clad had a clear bright color characteristic of pure nickel. Micro-examination disclosed excellent bonding of the nickel to the mild steel with good uniform diffusion throughout. On bending a section of the nickel coated mild steel over a ¾″ radius pin, the nickel did not separate from the mild steel backing plate.

EXAMPLE V

A plate 6″ by 8″ by 1″ of mild steel, A.S.T.M. Type A285–C, was sprayed with a mixture of approximately seven parts nickel to three parts copper using the plasma-arc spray method under argon gas; the sprayed surface having been previously prepared by grit blasting as in the previous examples. A cover plate of a similar type mild steel also 6″ by 8″ by 1″ was provided and placed together with an intermediate parting compound layer over the sprayed layer. The assembly was welded around its periphery with an area left for venting purposes. It was then heated to 2175° F. and held at this temperature for a period of 8 hours. The assembly was then allowed to cool in air to room temperature and separated for examination.

Whereas prior to the assembly, the coating had a dark dirty greyish appearance, after heating the nickel-copper coating had a clear bright color which is characteristic of nickel-base alloys of the Monel type alloys. Micro-examination disclosed a complete alloying of the coating and good diffusion with the mild steel base with a resultant good metallurgical bond.

EXAMPLE VI

A plate of mild steel, type A.S.T.M. A285–C, was prepared as shown in Example V above, except that following the heating step, the assembly was reduced to 25% of its original thickness by the application of pressure. The assembly was allowed to cool in air to room temperature and separated for examination.

Micro-examination disclosed an excellent nickel-base alloy clad metallurgically to the mild steel backing plate by diffusion. On bending a section of the nickel-base alloy coated mild steel over a ¾″ radius pin, the coating did not separate from the mild steel backing plate.

EXAMPLE VII

A plate of stainless steel, Type 304, four inches by four inches by one-quarter inch, was prepared on one of its sides by grit blasting. Nickel was then sprayed on such surface using the plasma-arc spray method under argon gas. A backing steel six inches by six inches by one inch of A.S.T.M. Type A387–D steel and a cover plate also six inches by six inches by one inch of A.S.T.M. Type A285–C steel were provided. The nickel coated plate of stainless steel was placed on the backing steel, the surface of which had previously been prepared by blasting, so that the nickel coated surface was adjacent to the blasted surface of the backing steel. The cover plate was then placed on the other side of the stainless steel with a parting compound applied between the stainless steel plate and the cover plate. The component parts were then welded around the periphery of the assembly except for one area employed as a vent hole. The assembly was heated to 2050° F. and held at this temperature for four hours. The assembly was allowed to air cool to room temperature before its separation and examination.

Whereas prior to the assembly, the nickel had a dirty, grey appearance, after the heating in the assembly form, the nickel was clear with a bright color which is characteristic of pure nickel. Although, as is to be expected in the absence of a pressure step, the nickel was not bonded one hundred percent metallurgically to the stainless steel. Still metallurgical bonding of approximately 10% occurred so that on separation of the assembly by force the nickel in the areas of such bonding pulled free of the surrounding nickel and adhered to the stainless steel or the steel of the backing plate.

EXAMPLE VIII

A plate of stainless steel was prepared in accordance with Example VII above except that following the heating step, the assembly was reduced to 33% of its original thickness by the application of pressure. Following this the assembly was allowed to cool in air to room temperature and examined.

As before, the nickel was clear with a bright color characteristic of pure nickel. Micro-inspection of the bonding area revealed a substantial metallurgical bond between the stainless steel and the backing plate. However, pockets of non adherence were detected which indicated that the surface of the stainless steel had retained areas of oxides which had not been completely cleaned from its surface at the time of spraying the nickel.

EXAMPLE IX

A backing plate 10" by 8" by 2" of A.S.T.M. Type A387–D steel was grit blasted on one of its surfaces. This surface was then sprayed with nickel using the plasma-arc spray method under argon gas. A stainless steel plate 8" by 6" by 1", type 321, was prepared on one surface for bonding by nickel electro-plating and an assembly was prepared with the sprayed nickel sandwiched by the backing steel on one side and the prepared surface of the stainless steel on the other. This assembly was then welded around the periphery except for a vent hole.

The assembly was heated to 2050° F. and held at this temperature for 16 hours. The assembly was allowed to cool to room temperature and then cut apart.

As in Example VIII, the nickel had the clear, bright color characteristic of pure nickel after heating although it had previously a dirty grey appearance at the time of the assembly. Despite the fact the pressure had not been applied, a significant portion of the area (over 50%) of the sprayed surfaces had been bonded metallurgically to the backing plate or the stainless steel. In a comparison between the sprayed nickel and electrolytic plated nickel, no structural differences could be noted except that the sprayed nickel was somewhat cleaner than the plated nickel.

EXAMPLE X

An assembly was prepared in accordance with Example IX above except that following the heating step, the assembly was reduced to 33% of its original thickness by the application of pressure. It was then allowed to cool to room temperature and cut apart for the purposes of examination. The nickel had the characteristic clear, bright color of pure nickel and, due to the pressure step, had a satisfactory metallurgical bond throughout.

The above description discloses several embodiments of the invention in that different base metals and various iron and nickel base alloy spray metals can be used. Also, the use of cladding layers of various metals, which are alloyable with nickel or nickel alloys, iron or Monel, may be used in specific language as employed in setting forth the invention. It will, nevertheless, be understood that no limitations of the scope of the invention are thereby contemplated and that various modifications may be made such as would occur to one skilled in the art to which the invention relates.

We claim:

1. A method of producing clad metal comprising the steps of spraying a non-refractory molten metal selected from the group consisting of nickel, copper and mixtures thereof on at least one surface of a metal plate of the class consisting of carbon and low alloy steels, said molten metal being sprayed under a cover of gas, forming a pack from said plate and at least one other metal plate with the sprayed metal interposed between said plates, substantially sealing said pack, elevating the temperature of said sealed pack by heating to a temperature sufficient to evolve carbon monoxide gas, continuing said elevated temperature in said pack until said carbon monoxide gases have reduced the oxides within said pack and whereby said sprayed metal consolidates and bonds to said first mentioned metal plate.

2. The method of claim 1 wherein said other plate is a cladding plate and said sprayed metal also bonds to said cladding plate.

3. The method of claim 2 wherein said cladding plate is stainless steel, said stainless steel having been first electroplated with a non-refractory metal on its side placed on the interior of said pack.

4. The method of claim 2 wherein pressure is applied to said pack to form a continuous metallurgical bond at the interface of said sprayed metal between said plates.

5. The method of claim 1 wherein said sprayed metal is nickel.

6. The method of claim 1 wherein pressure is applied to said pack to produce a continuous metallurgical bond between said sprayed metal and said first mentioned metal plate.

7. A method of producing clad steel comprising the steps of spraying a non-refractory molten metal selected from the group consisting of nickel, copper and mixtures thereof on at least one surface of a metal plate, said molten metal being sprayed under a cover of gas, forming a pack from said plate and at least one other metal plate from the class consisting of carbon and low alloy steels with the sprayed metal interposed between said plates, substantially sealing said pack, elevating the temperature of said sealed pack to a temperature of about 2000°–2350° F., continuing said elevated temperature in said pack until carbon monoxide gases have reduced the oxides within said pack and whereby said sprayed metal consolidates and bonds to said first mentioned plate.

8. A method of claim 7 wherein said first mentioned plate is a cladding plate.

9. The method of claim 8 wherein said first mentioned plate is stainless steel.

10. The method of claim 7 wherein said sprayed metal is nickel.

11. The method of claim 7 wherein pressure is applied to said pack to form a continuous metallurgical bond at the interface of said sprayed plate between said first mentioned first plate and said other plate.

12. The method of producing clad steel comprising the steps of spraying molten nickel by plasma-arc means under an inert gas on at least one surface of a metal plate of the class consisting of carbon and low alloy steels, forming a pack from said plate and at least one other metal plate with the sprayed metal interposed between said plates, sealing said pack by welding around its periphery, heating said pack to a temperature of about 2000° F.–2350° F. to produce carbon monoxide gas within said pack, maintaining said pack at said temperature for about one hour for each inch of thickness of said pack and until said carbon monoxide gases have reduced the oxides within said pack and whereby said nickel consolidates and bonds to said first mentioned metal plate, and rolling said pack to form a continuous metallurgical bond between said first mentioned plate and said sprayed nickel.

13. A method of producing clad steel comprising the steps of spraying molten nickel by plasma-arc means under an inert gas on at least one surface of a metal cladding plate, forming a pack from said cladding plate and at least one other metal plate of the class consisting of carbon and low alloy steels with the sprayed metal interposed between said plates, sealing said pack by welding around its periphery, heating said pack to a temperature of about 2000° F.–2350° F. to produce carbon monoxide gas within said pack, maintaining said pack at said temperature for about one hour for each inch of thickness of said pack and until said carbon monoxide gases have reduced the oxides within said pack and whereby said nickel consolidates and bonds to said plates, and rolling said pack to form a continuous metallurgical bond between said plates at the interface of said nickel layer.

14. The method of producing clad steel comprising the steps of spraying a mixture of molten nickel and copper by plasma-arc means under an inert gas on at least one surface of the metal of the class consisting of carbon and low alloy steels, forming a pack from said plate and at least one other metal plate with the sprayed metal interposed between said plates, sealing said pack by welding around its periphery, heating said pack to a temperature of about 2000° F.–2350° F. to produce carbon monoxide gas within said pack, maintaining said pack at said temperature for about one hour for each inch of thickness of said pack and until said carbon monoxide gases have reduced the oxides within said pack and whereby said nickel-copper mixture alloys and bonds to said first mentioned metal plate, and rolling said pack to form a continuous metallurgical bond between said first mentioned plate and said sprayed nickel-copper alloy.

References Cited by the Examiner
UNITED STATES PATENTS

| | | | |
|---|---|---|---|
| 2,390,452 | 12/1945 | Mudge | 29—502 |
| 2,748,067 | 5/1956 | Pease et al. | 29—502 X |
| 2,945,295 | 7/1960 | Feaster | 29—494 |
| 3,088,192 | 5/1963 | Turner | 29—497.5 X |

JOHN F. CAMPBELL, *Primary Examiner.*